US009798568B2

(12) United States Patent
Kim et al.

(10) Patent No.: US 9,798,568 B2
(45) Date of Patent: Oct. 24, 2017

(54) METHOD FOR SHARING RESOURCE USING A VIRTUAL DEVICE DRIVER AND ELECTRONIC DEVICE THEREOF

(71) Applicant: Samsung Electronics Co., Ltd., Suwon-si, Gyeonggi-do (KR)

(72) Inventors: Dong-Hyun Kim, Yongin-si (KR); Yong-Gil Han, Gumi-si (KR); Soon-Sang Park, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/962,292

(22) Filed: Dec. 8, 2015

(65) Prior Publication Data
US 2016/0188358 A1 Jun. 30, 2016

(30) Foreign Application Priority Data
Dec. 29, 2014 (KR) .................. 10-2014-0191880

(51) Int. Cl.
*G06F 9/455* (2006.01)
*H04L 29/08* (2006.01)
*G06F 13/10* (2006.01)
*G06F 9/44* (2006.01)
*G06F 9/50* (2006.01)

(52) U.S. Cl.
CPC ........ *G06F 9/45558* (2013.01); *G06F 9/4411* (2013.01); *G06F 13/102* (2013.01); *G06F 13/105* (2013.01); *H04L 67/16* (2013.01); *H04L 67/34* (2013.01); *G06F 9/5061* (2013.01); *G06F 2009/45579* (2013.01); *H04L 67/125* (2013.01)

(58) Field of Classification Search
None
See application file for complete search history.

(56) References Cited

U.S. PATENT DOCUMENTS

| 6,711,629 | B1 | 3/2004 | Christensen et al. |
| 8,572,631 | B2 | 10/2013 | Wilson |
| 8,683,110 | B2 | 3/2014 | Suzuki et al. |
| 2005/0015430 | A1 | 1/2005 | Rothman et al. |
| 2005/0114870 | A1* | 5/2005 | Song ............... G06F 21/52 719/328 |

(Continued)

FOREIGN PATENT DOCUMENTS

| EP | 2607982 A1 | 6/2013 |
| JP | 2000-330702 A | 11/2000 |

(Continued)

*Primary Examiner* — Tuan Dao
(74) *Attorney, Agent, or Firm* — Jefferson IP Law, LLP

(57) ABSTRACT

A method of sharing a resource using a virtual device driver and an electronic device thereof are provided. The method includes generating a virtual device driver, which corresponds to a real device driver of a host electronic device, in the client electronic device, receiving a resource from the host electronic device by using the virtual device driver through a first communication mechanism designated in the host electronic device, and after the first communication mechanism is changed to a second communication mechanism designated in the host electronic device, receiving the resource from the host electronic device by using the virtual device driver.

20 Claims, 19 Drawing Sheets

(56) References Cited

U.S. PATENT DOCUMENTS

| | | | |
|---|---|---|---|
| 2005/0257218 A1* | 11/2005 | Lin | G06F 9/4411 717/178 |
| 2006/0056446 A1* | 3/2006 | Lee | H04L 29/06 370/465 |
| 2007/0011446 A1 | 1/2007 | Kato et al. | |
| 2007/0040021 A1* | 2/2007 | Nakayma | G06F 12/1408 235/380 |
| 2007/0061477 A1 | 3/2007 | Stoyanov et al. | |
| 2007/0240149 A1* | 10/2007 | Cromer | G06F 9/45541 717/171 |
| 2010/0161871 A1 | 6/2010 | Kakish | |
| 2010/0293559 A1 | 11/2010 | Aciicmez et al. | |
| 2011/0013223 A1* | 1/2011 | Nishimura | G06F 3/1203 358/1.15 |
| 2011/0032816 A1* | 2/2011 | Isaksson | H04W 76/028 370/225 |
| 2011/0043854 A1* | 2/2011 | Sakikawa | G06F 3/1207 358/1.15 |
| 2011/0289518 A1 | 11/2011 | Li et al. | |
| 2012/0079143 A1* | 3/2012 | Krishnamurthi | H04L 49/90 710/39 |
| 2012/0221736 A1 | 8/2012 | Endo et al. | |
| 2013/0007317 A1* | 1/2013 | Seo | G06F 13/102 710/63 |
| 2013/0016202 A1 | 1/2013 | Munegowda et al. | |
| 2014/0330978 A1 | 11/2014 | Venkatesh et al. | |
| 2014/0380504 A1* | 12/2014 | Ho | G06F 21/00 726/27 |

FOREIGN PATENT DOCUMENTS

| | | |
|---|---|---|
| JP | 2002-163226 A | 6/2002 |
| JP | 4242420 B2 | 3/2009 |
| JP | 2009-187353 A | 8/2009 |
| JP | 2012-048297 A | 3/2012 |
| KR | 10-2001-0110835 A | 12/2001 |
| KR | 10-2005-0052119 A | 6/2005 |
| KR | 10-2006-0033990 A | 4/2006 |
| KR | 10-670447 B1 | 1/2007 |
| KR | 20100122431 A | 11/2010 |
| KR | 20100128630 A | 12/2010 |
| KR | 101287839 B1 | 7/2013 |

* cited by examiner

Virtual Device Driver Configuration Information (526)

| Client ID | Virtual Device Driver ID | Protocol Type | Sampling Rate | Frame Rate | Resolution |
|---|---|---|---|---|---|
| Client 1 | VDD ID# | TCP | S/R # | F/R # | Resol # |
| Client 2 | VDD ID# | UDP | S/R # | F/R # | Resol # |
| Client 1 | VDD ID# | UDP | S/R # | F/R # | - |
| Client 2 | VDD ID# | TCP | S/R # | F/R # | - |
| Client 1 | VDD ID# | UDP | S/R # | F/R # | Resol # |
| ⋮ | ⋮ | ⋮ | ⋮ | ⋮ | ⋮ |

FIG.5

Virtual Device Driver Configuration Information (626)

| Client ID | Application ID | Protocol Type | Sampling Rate | Frame Rate | Resolution |
|---|---|---|---|---|---|
| Client 1 | App ID# | TCP | S/R # | F/R # | Resol # |
| Client 2 | App ID# | UDP | S/R # | F/R # | Resol # |
| Client 1 | App ID# | UDP | S/R # | F/R # | - |
| Client 2 | App ID# | TCP | S/R # | F/R # | - |
| Client 1 | App ID# | UDP | S/R # | F/R # | Resol # |
| ⋮ | ⋮ | ⋮ | ⋮ | ⋮ | ⋮ |

FIG.6

METHOD FOR SHARING RESOURCE USING A VIRTUAL DEVICE DRIVER AND ELECTRONIC DEVICE THEREOF

CROSS-REFERENCE TO RELATED APPLICATION(S)

This application claims the benefit under 35 U.S.C. §119(a) of a Korean patent application filed on Dec. 29, 2014 in the Korean Intellectual Property Office and assigned Serial number 10-2014-0191880, the entire disclosure of which is hereby incorporated by reference.

TECHNICAL FIELD

The present disclosure relates to a method of sharing a resource using a virtual device driver and an electronic device thereof.

BACKGROUND

Recently, without being limited to electronic devices designed in a firmware level for a purpose of a specific single function, the electronic devices have a computer operating system (OS) embedded therein, and thus are changed to multifunctional electronic devices for providing several services to a user to achieve various purposes by executing an application.

The aforementioned environment is extendedly applied to various types of electronic devices such as a smart television (TV), a tablet personal computer (PC), and the like, for example, on the basis of commercialization of a smart phone. With the widespread use of electronic devices having the OS and a network communication interface, the electronic devices can communicate with each other through several communication mechanisms. Therefore, new services can now be provided not through a physical convergence between the electronic devices but through a software convergence.

A representative function of the software convergence includes a remote control function for controlling several different neighboring electronic devices in a remote manner by using a mobile electronic device. Examples of the function may include a TV remote control function using a mobile electronic device (e.g., iPhone) of a specific company (e.g., Apple Inc.), a home theater remote control function, a car remote control function, or a remote mouse/keyboard function for a PC.

Since each of the aforementioned electronic devices has a specific physical input means (e.g., a remote controller), there is a disadvantage in that a user must own a plurality of physical input means to control each of the corresponding electronic devices. To solve such a disadvantage, various remote control functions may be included in a mobile electronic device such as a smart phone and the like typically carried by the user, thereby being able to provide user convenience.

FIG. 1 illustrates an example of sharing a resource between a typical remote host 100 and a local client 120 through a network 110 according to the related art.

Referring to FIG. 1, for example, the host 100 may be a server, and the client 120 may be a mobile terminal such as a smart phone and the like.

The host 100 may have a host application 100a. The client 120 may have a client application 120a linked with the host application. Since the host application 100a and the client application 120a are mutually executed and linked, the resource of the host 100, for example, an image captured by a camera 100b, may be shared by the client 120 on a real-time basis.

That is, each of the host 100 and the client 120 must have applications linked with each other in order for the client 120 to share data of the resource owned by the host 100, and thus disadvantageously, there is a need to design in advance hard-coded applications by considering in advance all resources that can be used in the host 100.

If the client 120 shares the resource of the host 100 through the network 110, a network traffic, a latency time, and the like are increased. Further, according to a performance, network environment, and the like of the client 120 which shares several resources used in the host 100, the network traffic, the latency time, and the like may be more increased.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a resource sharing method using a virtual device driver capable of decreasing a network traffic, a latency time, and the like in such a manner that, for example, a client electronic device shares a resource of a host electronic device by using an effective communication mechanism, and an electronic device using the method.

Another aspect of the present disclosure is to provide a method of operating a client electronic device. The method includes generating a virtual device driver, which corresponds to a real device driver of a host electronic device, in the client electronic device, receiving a resource from the host electronic device by using the virtual device driver through a first communication mechanism designated in the host electronic device, and after the first communication mechanism is changed to a second communication mechanism designated in the host electronic device, receiving the resource from the host electronic device by using the virtual device driver.

Another aspect of the present disclosure is to provide a client electronic device. The client electronic device includes a communication module for communicating with a host electronic device, and a processor for controlling the communication module, wherein the processor is configured to generate a virtual device driver, which corresponds to a real device driver of a host electronic device, in the client electronic device, to receive a resource from the host electronic device by using the virtual device driver through a first communication mechanism designated in the host electronic device, and after the first communication mechanism is changed to a second communication mechanism designated in the host electronic device, to receive the resource from the host electronic device by using the virtual device driver.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5 and 6 illustrate virtual device driver configuration information according to various embodiments of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the present disclosure, a client electronic device may generate a virtual device driver corresponding to a real device driver of a host electronic device, and may effectively share a resource of the host electronic device by using the virtual device driver through a communication mechanism designated by the host electronic device in accordance with the virtual device driver.

For example, the client electronic device may be various types of mobile electronic devices such as a smart phone, a tablet personal computer (PC), and the like, and the host electronic device may be a server for providing various resources through a network.

The client electronic device and the host electronic device may be referred to as various other names such as a local device, a remote device, a computer machine, a computer system, and the like. Hereinafter, the devices are commonly referred to as the client electronic device and the host electronic device.

Figure 1:
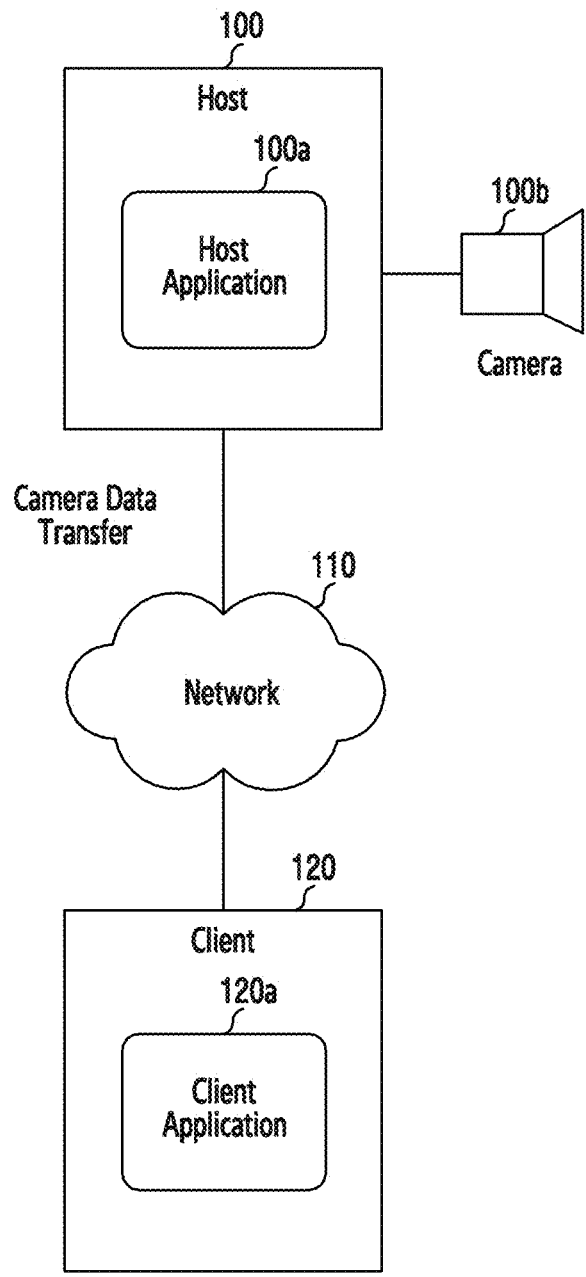
FIG. 1 illustrates an example of sharing a resource between a typical remote host and a local client through a network according to the related art.
Figure 2:
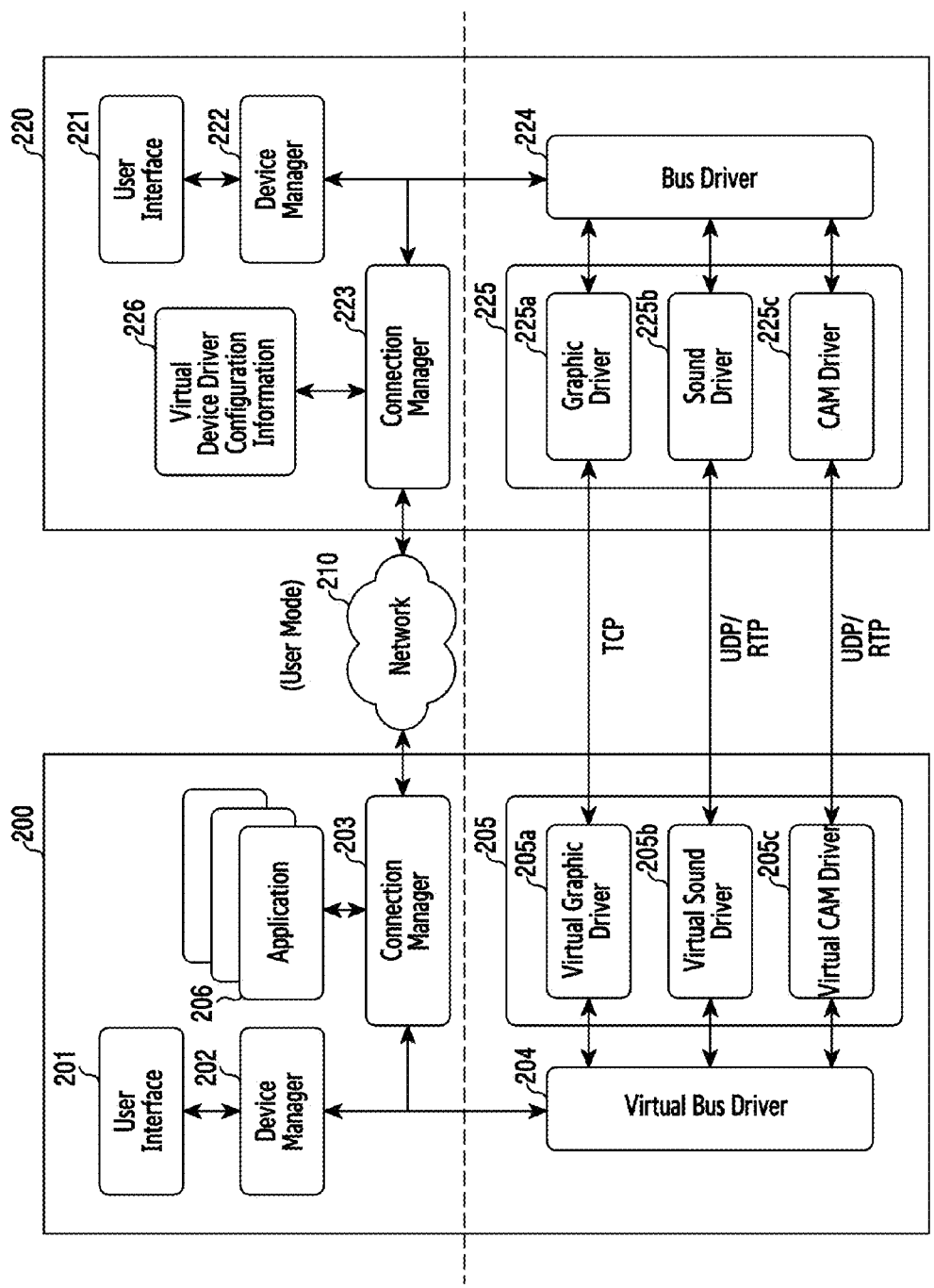
FIGS. 2 and 3 illustrate an example of a structure of a client electronic device and a host electronic device according to various embodiments of the present disclosure.
Figure 3:
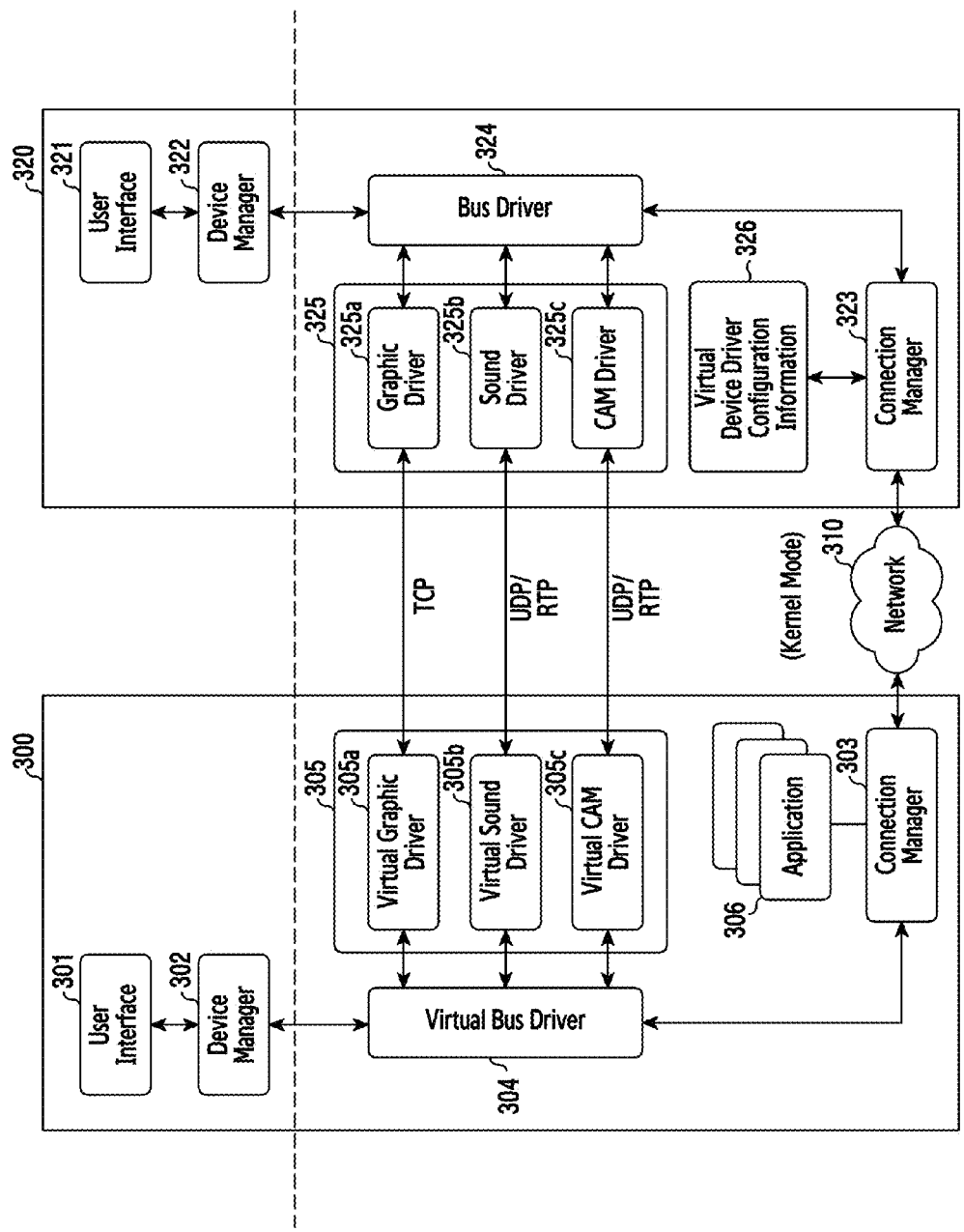

FIGS. 2 and 3 illustrate an example of a structure of client electronic devices 200 and 300 and host electronic devices 220 and 320 according to various embodiments of the present disclosure.

Referring to FIG. 2, the client electronic device 200 may include a user interface 201, a device manager 202, a connection manager 203, a virtual bus driver 204, a virtual device driver 205, one or more applications 206, and the like.

The virtual device driver 205 may include, for example, a virtual graphic driver 205*a*, a virtual sound driver 205*b*, a virtual camera driver 205*c*, and the like. At least one of the aforementioned constitutional elements may be included in a communication module (not shown) included in the client electronic device 200 and a processor (not shown) for controlling the communication module.

The host electronic device 220 may include a user interface 221, a device manager 222, a connection manager 223, a bus driver 224, a device driver 225, virtual device driver configuration information 226, and the like.

The device driver 225 may include, for example, a graphic driver 225a, a sound driver 225b, a camera driver 225c, and the like. At least one of the aforementioned constitutional elements may be included in a communication module (not shown) included in the host electronic device 220 and a processor (not shown) for controlling the communication module.

The device driver 225 may be referred to as a real device driver to distinguish from the virtual device driver 205. The graphic driver 225a, the sound driver 225b, and the camera driver 225c may similarly be referred to as a real graphic driver, a real sound driver, and a real camera driver to distinguish from the virtual graphic driver 205a, the virtual sound driver 205b, and the virtual camera driver 205c.

The host electronic device 220 may be referred to as a host computer, a host program, and the like for supporting sharing of various types of input/output (I/O) resources, for example, a modem, a fax, a printer, a camera, and the like by the client electronic device 200 connected through a network 210.

The client electronic device 200 may be referred to as a client computer, a client program, and the like capable of sharing various types of I/O resources from the host electronic device 220 connected through the network 210.

The user interfaces 201 and 221 may be implemented in physical hardware or logical software as a physical or virtual medium implemented for a temporary or permanent connection to allow communication between a user and a computer system. The device managers 202 and 222 may be included in an operating system (OS) of a computer system, and may be a software constitutional element for device management.

The connection managers 203 and 223 may play a role of, for example, connecting the virtual device driver 205 and the real device driver 225 through the network, controlling communication module management and registration, communication channel establishment and termination, and the like, broadcasting information of the client electronic device, and discovering a communication channel of the host electronic device.

The connection managers 203 and 223 may control data communication between the client electronic device 200 and the host electronic device 220, and may simultaneously deliver data of various several resources to a plurality of client electronic devices by using the real device driver 225 of the host electronic device 220.

The real device driver 225 may be included inside the host electronic device 220, or may be an external device driver used by being connected in a wired/wireless fashion. The virtual device driver 205 may be a software constitutional element which emulates a hardware device. For example, in a Windows OS, the virtual device driver 205 may be a virtual device driver for handling not a hardware interrupt but a software interrupt which occurs on the OS.

The virtual bus driver 204 is a constitutional element for delivering data between the virtual device driver 205 and the device manager 202. The virtual device driver configuration information 226 may be stored and managed in a lookup table form and the like to determine an optimal communication mechanism when the real device driver 225 and the virtual device driver 205 are connected to the network, and may be network connection information for data communication and communication set information for determining how to deliver data.

The client electronic device 200 and the host electronic device 220 may include, for example, a user mode and a kernel mode. Referring to FIG. 2, the user mode of the client electronic device 200 may include the user interface 201, the device manager 202, the connection manager 203, and the like.

Referring to FIG. 3, the kernel mode of the client electronic device 300 may include a connection manager 303, a virtual bus driver 304, a virtual device driver 305, and the like.

A user interface 301 of the client electronic device provides an interaction with a user. For example, the user interface 301 acquires display information, a user request, and the like, and delivers the acquired result to a device manager 302. The device manager 302 plays an intermediary role between the user interface 301 and the connection manager 303, and upon receiving a control request from the user interface 301, delivers it to the connection manager 303.

An operation of managing the client electronic device may include all of physical or remote device discovery and registration, device plug-and-play, and the like, and may also include all of broadcasting for local device information, managing a connection between different computer systems, and the like.

A function of managing a connection between the different computer systems may be provided by the connection manager 303. For example, the connection manager 303 may play a role of transmitting/receiving data by controlling network communication between the computer systems.

As an embodiment of the present disclosure, the connection manager 303 may allow various types of connections between the computer systems, and may control various communication functions. For example, the connection manager 303 may control functions of managing and registering a communication module, establishing and terminating a communication channel, broadcasting client electronic device information, discovering a communication channel of a host electronic device, and transmitting/receiving data between the computer systems.

The connection manager 303 may be included in a user mode as shown in FIG. 2, or may be included in a kernel mode as shown in FIG. 3. The kernel mode may correspond to an execution mode of a process in which an access to all system memories and central processing unit (CPU) instructions is allowed.

The virtual graphic driver 305a, virtual sound driver 305b, virtual camera driver 305c, network 310, user interface 321, device manager 322, connection manager 323, bus driver 324, device driver 325, graphic driver 325a, sound driver 325b, camera driver 325c, and virtual device driver configuration information 326 are substantially similar in function to the corresponding elements described above with respect to FIG. 2, and a description thereof will therefore not be repeated.

Figure 4:
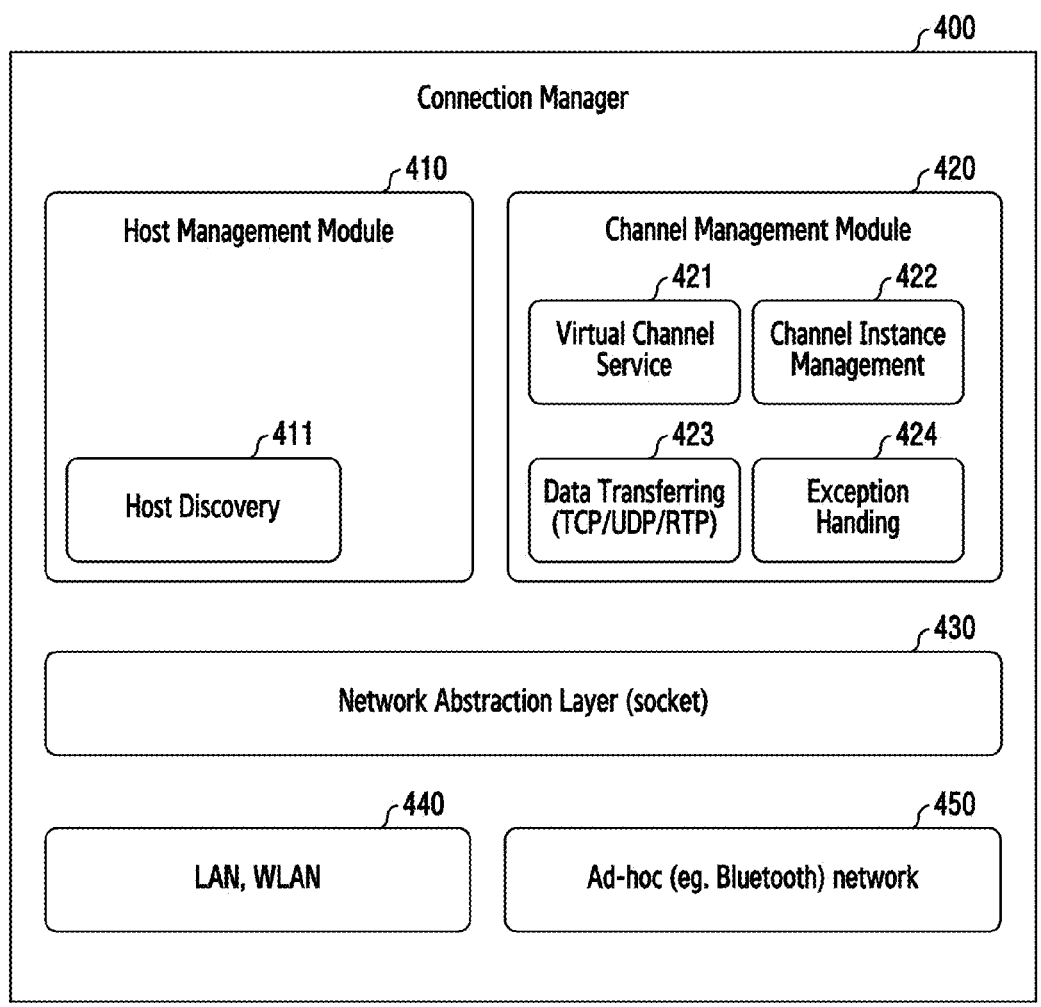
FIG. 4 illustrates a constitutional element of a connection manager according to various embodiments of the present disclosure.

FIG. 4 illustrates a constitutional element of a connection manager 400 according to various embodiments of the present disclosure.

Referring to FIG. 4, the connection manager 400 may include a constitutional element such as a host management module 410, a channel management module 420, a network abstraction layer (socket) 430, a local area network (LAN)/wireless LAN (WLAN) 440, an ad-hoc network 450, and the like.

The host management module 410 may include a host discovery 411. The channel management module 420 may include a virtual channel service 421, a channel instance management 422, data transferring 423, exception handling 424, and the like.

The virtual channel service 421 may manage at least one virtual channel so as to appear as if it is a host (e.g., a server) to which at least one client is connected. The channel instance management 422 may perform management by connecting the virtual channel and a socket. The data transferring 423 may control sending and reception of data through the virtual channel.

The virtual channel service 421 may configure a unique name for each virtual channel. For example, a name of any one virtual channel may be "//servername/channel/channelname". Herein, the "servername" may be a name of a remote computer system (e.g., a host electronic device), and a connection application program interface (API) may display a virtual channel name and a name associated with a computer system by enumerating the names together.

The host management module 410 is a constitutional element for discovering and managing a host that can be used on a network. The connection manager 400 may provide a relay function so that a resource of a host electronic device (e.g., a server) can be shared by electronic devices of one or more different client electronic devices.

The applications 206 and 306 which use the virtual device driver have an application identifier (ID) as a unique identifier. The application ID may be generated based on a name of a corresponding application, a universally unique ID (UUID), a serial number, and the like.

The virtual device driver has a virtual device driver ID as a unique identifier. An ID of the virtual device driver may be an ID and the like of a virtual device which operates in an OS kernel of a client electronic device.

FIGS. 5 and 6 illustrate virtual device driver configuration information 526 and 626 according to various embodiments of the present disclosure. The virtual device driver configuration information 526 and 626 is information stored and managed by a host electronic device, and may be stored and managed in advance in a form of a lookup table and the like to determine an optimal communication mechanism when a real device driver of the host electronic device and a virtual device driver of a client electronic device are connected through a network.

The virtual device driver configuration information 526 and 626 may be network connection information for optimizing data communication between the real device driver and the virtual device driver and information for determining a specific mechanism by which data will be transmitted and received.

Referring to FIG. 5, the virtual device driver configuration information 526 may be stored in such a manner that information fields such as a client ID, a virtual device driver ID, a protocol type, a sampling rate, a frame rate, a resolution, and the like are associated in a list form.

For example, the virtual device driver configuration information 526 may be stored in such a manner that the protocol type, sampling rate, the frame rate, resolution, and the like for determining the optimal communication mechanism are pre-associated based on a virtual device driver ID (e.g., VDD ID#) received from the client electronic device.

Referring to FIG. 6, the virtual device driver configuration information 626 may be stored in such a manner that information fields such as a client ID, an application ID which uses a virtual device driver, a protocol type, a sampling rate, a frame rate, a resolution, and the like are associated in a list form.

For example, the virtual device driver configuration information 626 may be stored in such a manner that the protocol type, sampling rate, frame rate, resolution, and the like for determining the optimal communication mechanism are pre-associated based on an application ID (e.g., App ID#) received from a client electronic device, that is, an ID of an application which uses a virtual device driver.

Figure 7:
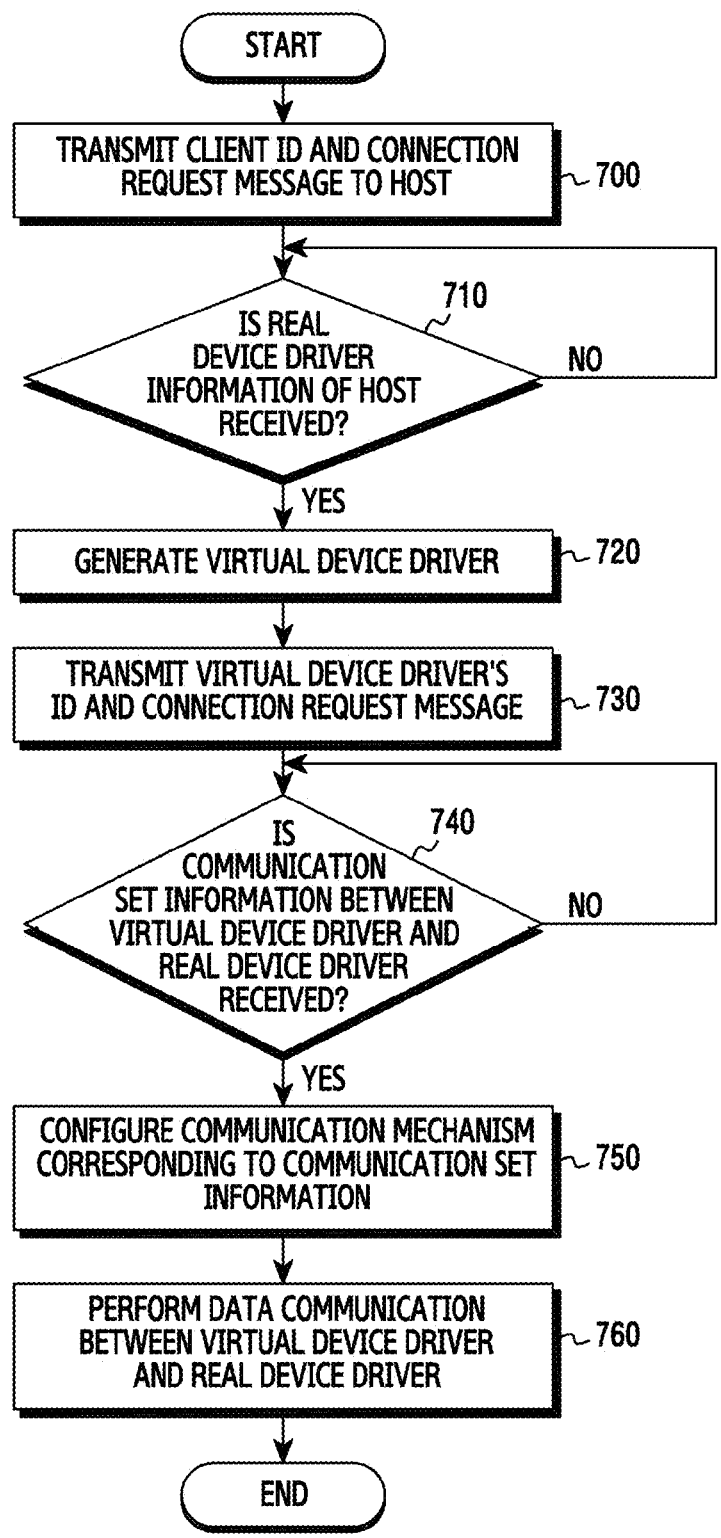
FIG. 7 is a flowchart illustrating an operation of a client electronic device according to various embodiments of the present disclosure.

FIG. 7 is a flowchart illustrating an operation of a client electronic device according to various embodiments of the present disclosure.

Referring to FIG. 7, in operation 700, the client electronic device may generate a client ID (e.g., a client ID#) which is a unique identifier assigned to the client electronic device and a connection request message, and may transmit the generated ID and message to a remote host electronic device. For example, the client ID may be transmitted by being included in the connection request message, or may be transmitted as an additional transmission packet or transmission message and the like.

In operation 710, the client electronic device may receive a response message transmitted from the host electronic device, and may determine whether real device driver information of the host electronic device is received together with the response message. For example, the real drive driver information may be received by being included in the response message, or may be received as an additional transmission packet or transmission message and the like.

In operation 720, as a result of the determination, if the real device driver information is received, the client electronic device may generate a virtual device driver corresponding to the real device driver information. For example, the client electronic device may generate the virtual device driver corresponding to the real device driver information by activating the virtual device driver if the virtual device driver has already been used by being downloaded from the host electronic device.

Meanwhile, if the virtual device driver has not been downloaded, a virtual device driver associated with the real device driver information may be generated by being downloaded from the host electronic device and installed through an interface with the host electronic device.

In operation 730, after generating the virtual device driver, the client electronic device may transmit a virtual device driver ID (e.g., DDR ID#), which is a unique identifier of the generated virtual device driver, and a connection request message to the host electronic device. For example, the virtual device driver ID may be transmitted by being included in the connection request message, or may be transmitted as an additional transmission packet or transmission message and the like.

In operation 740, the client electronic device may receive a response message transmitted from the host electronic device, and may determine whether communication set information for configuring an optimal communication mechanism between the real device driver and the virtual device driver is received together with the response message. For example, the communication set information may be received by being included in the response message, or may be received as an additional transmission packet or transmission message and the like.

In operation 750, as a result of the determination, if the communication set information is received, the client electronic device may configure a communication mechanism of the virtual device driver according to the communication set information. For example, according to a specific protocol type, sampling rate, frame rate, resolution, and the like designated by the communication set information, each data communication protocol of a virtual graphic driver, virtual sound driver, and virtual camera driver included in the virtual device driver may be configured.

In operation 760, according to the each configured data communication protocol, the client electronic device may share a resource of the host electronic device by performing data communication between the virtual device driver and the real device driver.

Accordingly, since the data communication mechanism between the virtual device driver and the real device driver can be configured not with a specific fixed value but with any optimized variable value, a network traffic, a latency time, and the like can be effectively decreased.

Figure 8:
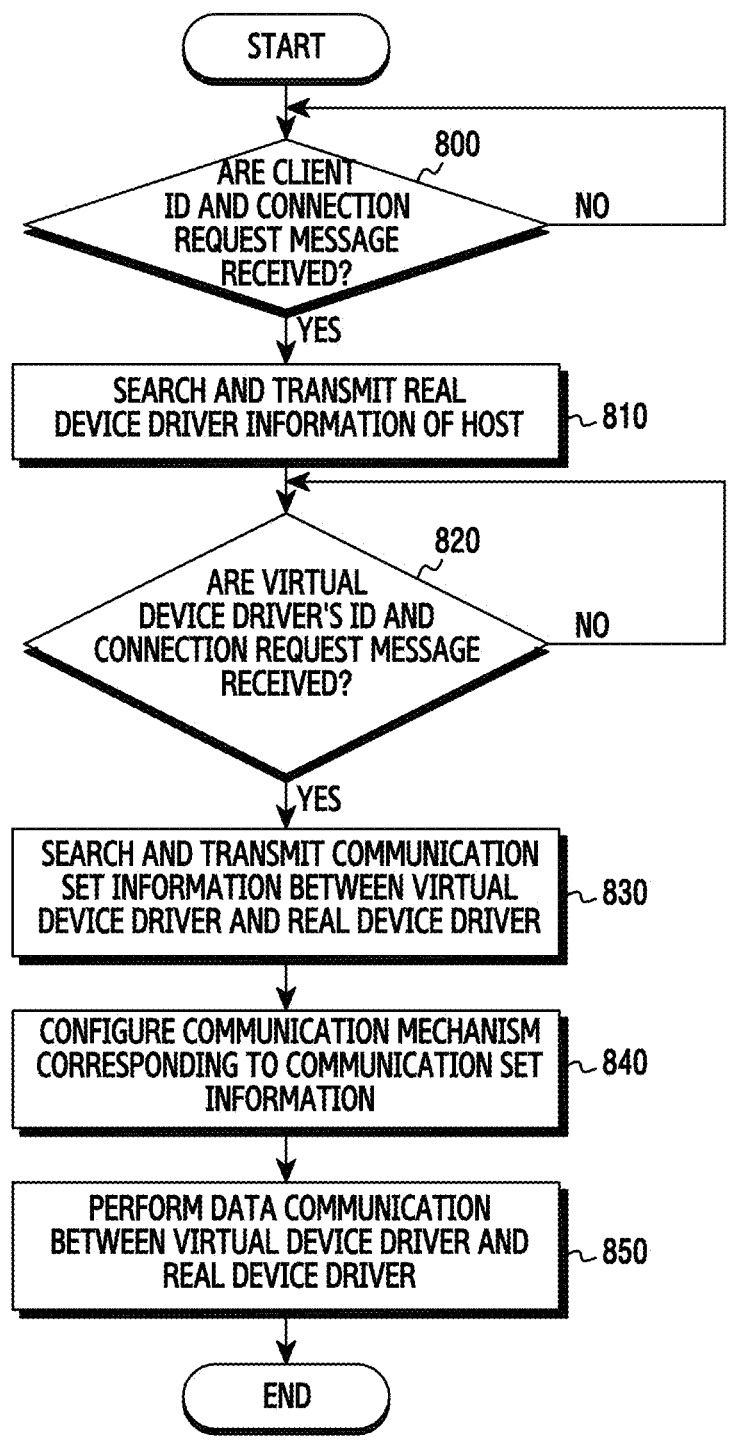
FIG. 8 is a flowchart illustrating an operation of a host electronic device according to various embodiments of the present disclosure.

FIG. 8 is a flowchart illustrating an operation of a host electronic device according to various embodiments of the present disclosure.

Referring to FIG. 8, in operation 800, the host electronic device may determine whether a client ID (e.g., a client ID#) and connection request message transmitted from a client electronic device through a network is received. For example, the client ID may be received by being included in the connection request message, or may be received as an additional transmission packet, transmission message, and the like.

In operation 810, as a result of the determination, if the client ID is received, the host electronic device may transmit real device driver information of the host electronic device to the client electronic device based on the client ID. Herein, the real device driver information may be information for allowing the client electronic device to activate and generate the virtual device driver corresponding to the real device driver information.

For example, if the virtual device driver corresponding to the real device driver information has been used by being downloaded from the host electronic device, the client electronic device may activate and generate the virtual device driver corresponding to the real device driver information. If the virtual device driver has never been downloaded, the virtual device driver may be downloaded and installed through an interface with the host electronic device.

In operation 820, the host electronic device may determine whether a connection request message and a virtual device driver's ID (e.g., DDR ID#) transmitted from the client electronic device is received. For example, the virtual device driver ID may be received by being included in the connection request message, or may be received as an additional transmission packet or transmission message and the like.

In operation 830, as a result of the determination, if the virtual device driver's ID is received, the host electronic device may transmit communication set information corresponding to the virtual device driver's ID to the client electronic device. For example, the communication set information may be transmitted by being included in a response message transmitted to the client electronic device, or may be transmitted as an additional transmission packet or transmission message and the like.

In operation 840, the host electronic device may configure a communication mechanism of the virtual device driver according to the communication set information. For example, according to a specific protocol type, sampling rate, frame rate, resolution, and the like designated by the communication set information, each data communication protocol of a virtual graphic driver, virtual sound driver, and virtual camera driver included in the virtual device driver may be configured.

In operation 850, according to the each configured data communication protocol, the host electronic device may share a resource of the host electronic device by performing data communication between the virtual device driver and the real device driver.

Accordingly, since the data communication mechanism between the virtual device driver and the real device driver can be configured not with a specific fixed value but with any optimized variable value, a network traffic, a latency time, and the like can be effectively decreased.

Figure 9:
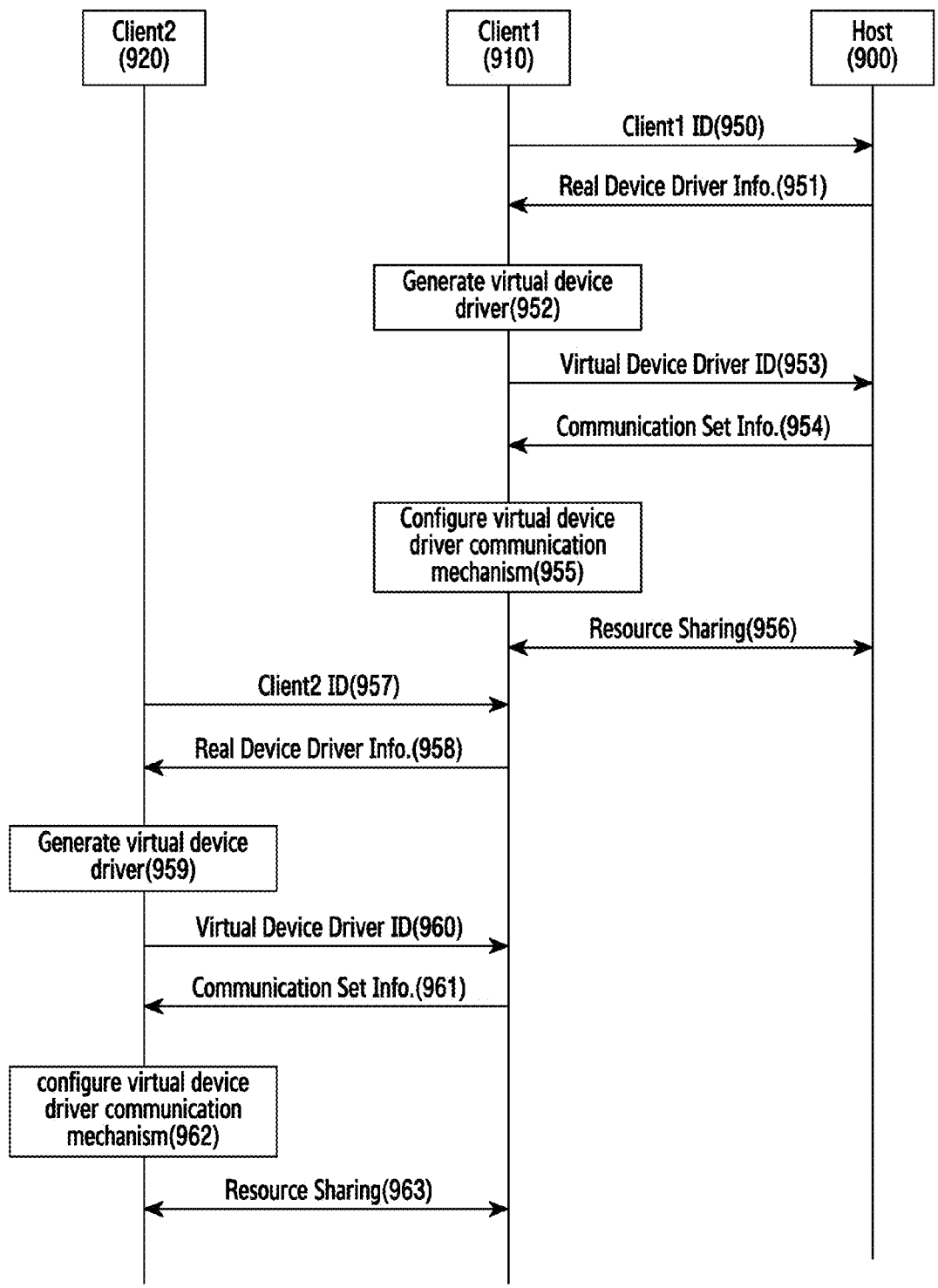
FIG. 9 is a flowchart of an operation in which a plurality of client electronic devices share a resource of a host electronic device according to various embodiments of the present disclosure.

FIG. 9 is a flowchart of an operation in which a plurality of client electronic devices 910 and 920 share a resource of a host electronic device 900 according to various embodiments of the present disclosure.

For example, the first client electronic device 910 may directly share a resource of the host electronic device 900 through a network, and the second client electronic device 920 may indirectly share a resource of the host electronic device 900 through the first client electronic device 910. The first client electronic device 910 and second client electronic device 920 may share the same, or different, resources of the host electronic device 900 in this manner.

Referring to FIG. 9, in operation 950, the first client electronic device 910 may be subjected to a user authentication process with respect to the host electronic device 900, and thereafter may transmit a client ID (e.g., a client1 ID) which is a unique identification assigned thereto to the host electronic device 900. In operation 951, the host electronic device 900 may transmit real device driver information for resource sharing to the first client electronic device 910.

In operation 952, the first client electronic device 910 may generate a virtual device driver based on the received real device driver information. In operation 953, the first client electronic device 910 may transmit a virtual device driver ID which is a unique identifier of the generated virtual device driver to the host electronic device 900.

In operation 954, the host electronic device 900 may determine an optimal communication mechanism between the real device driver and the virtual device driver based on the virtual device driver ID. For example, by searching for the virtual device driver configuration information described above with reference to FIG. 5, communication set information such as a specific protocol type, sampling rate, frame rate, resolution, and the like associated with the virtual device driver ID may be transmitted to the first client electronic device 910.

Herein, instead of the virtual device driver ID, an ID of an application which uses the virtual device driver may alternatively be transmitted to the host electronic device 900. In this case, the host electronic device 900 may search for the virtual device driver configuration information described above with reference to FIG. 6 and thus may transmit communication set information such as the specific protocol type, sampling rate, frame rate, resolution, and the like associated with the application ID to the first client electronic device 910.

In operation 955, the first client electronic device 910 may configure a communication mechanism of the virtual device driver according to the communication set information. In operation 956, the first client electronic device 910 may perform data communication between the first client electronic device 910 and the host electronic device 900 and thus may effectively share a resource of the host electronic device 900.

In operation 957, the second client electronic device 920 may be subjected to a user authentication process with respect to the first client electronic device 910, and thereafter may transmit a client ID (e.g., a client2 ID), which is a unique identification assigned thereto, to the first client electronic device 910. In operation 958, the first client electronic device 910 may transmit real device driver information for resource sharing to the second client electronic device 920.

In operation 959, the second client electronic device 920 may generate a virtual device driver based on the received real device driver information. In operation 960, the second client electronic device 920 may transmit a virtual device driver ID which is a unique identifier of the generated virtual device driver to the first electronic device 910.

In operation 961, the first client electronic device 910 may transmit communication set information such as a specific protocol type, sampling rate, frame rate, resolution, and the like determined by using an optimized communication mechanism between the real device driver and the virtual device driver to the second client electronic device 920 based on the virtual device driver ID.

Herein, instead of the virtual device driver ID, an ID of an application in the second client electronic device 920 which uses the virtual device driver may be transmitted to the first client electronic device 910. In this case, the first client electronic device 910 may transmit communication set information such as the specific protocol type, sampling rate, frame rate, resolution, and the like determined by using the optimized communication mechanism based on the application ID to the second client electronic device 920.

In operation 962, the second client electronic device 920 may configure a communication mechanism of the virtual device driver according to the communication set information. In operation 963, the second client electronic device 920 may perform data communication with the first client electronic device 910 and thus may indirectly share the resource of the host electronic device 900.

Figure 10:
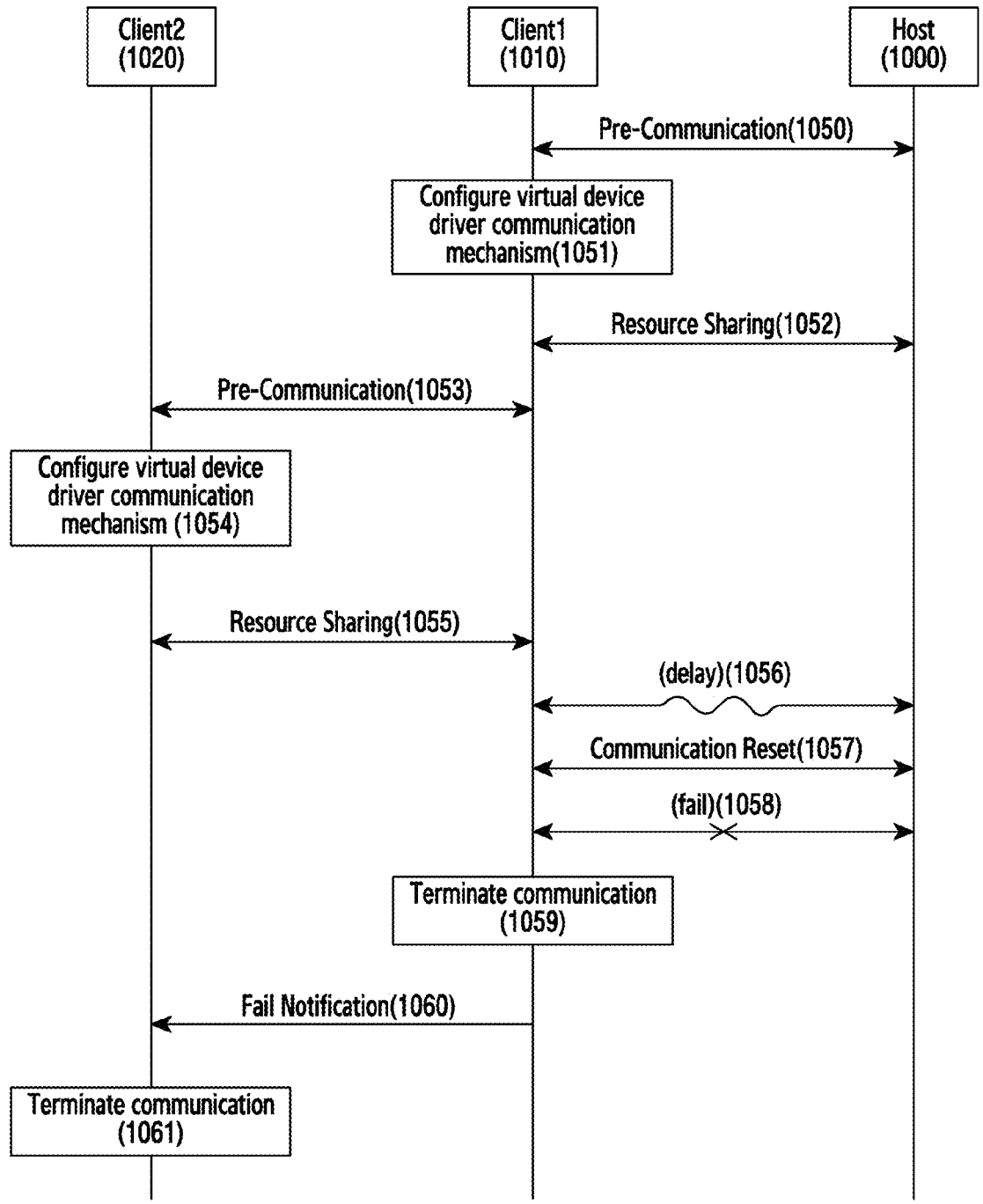
FIG. 10 is a flowchart illustrating an operation in which a plurality of client electronic devices terminate resource sharing of a host electronic device according to various embodiments of the present disclosure.

FIG. 10 is a flowchart illustrating an operation in which a plurality of client electronic devices 1010 and 1020 terminate resource sharing of a host electronic device 1000 according to various embodiments of the present disclosure.

For example, the first client electronic device 1010 may directly share a resource of the host electronic device 1000 through a network, and the second client electronic device 1020 may indirectly share the resource of the host electronic device 1000 through the first client electronic device 1010.

Referring to FIG. 10, in operation 1050, the first client electronic device 1010 may perform a user authentication process and a pre-communication operation with respect to the host electronic device 1000. In operation 1051, the first client electronic device 1010 may configure a communication mechanism of the virtual device driver according to a communication mechanism determined by the host electronic device 1000 through the pre-communication operation.

In operation 1052, the first client electronic device 1010 may directly share a resource of the host electronic device 1000 by performing data communication with the host electronic device 1000 by using the virtual device driver.

In operation 1053, the second client electronic device 1020 may perform a user authentication process and a pre-communication operation with respect to the client electronic device 1010. In operation 1054, the second client electronic device 1020 may configure a communication mechanism of the virtual device driver according to a communication mechanism determined by the first client electronic device 1010 through the pre-communication operation.

In operation 1055, the second client electronic device 1020 may indirectly share the resource of the host electronic device 1000 through the first client electronic device 1010 by performing data communication with the first client electronic device 1010 by using the virtual device driver.

In operation 1056, in a case where data communication with the host electronic device 1000 is delayed, then in operation 1057, the first client electronic device 1010 may reset the communication mechanism of the device driver through an interface with the host electronic device 1000, thereby addressing the data communication delay caused by a network environment and the like.

In operation 1058, in a case where data communication with the host electronic device 1000 is disconnected, if data communication fails despite a specific number of retrials, in operation 1059, the first client electronic device 1010 may configure a communication termination and stop a resource sharing operation.

In operation 1060, the first client electronic device 1010 may generate a fail notification message when the communication terminal is configured, and thereafter may transmit the message to the second client electronic device 1020. In operation 1061, the second client electronic device 1020 may confirm the fail notification message, and thus may configure a communication termination with the first client electronic device 1010 and may stop the resource sharing operation.

Figure 11:
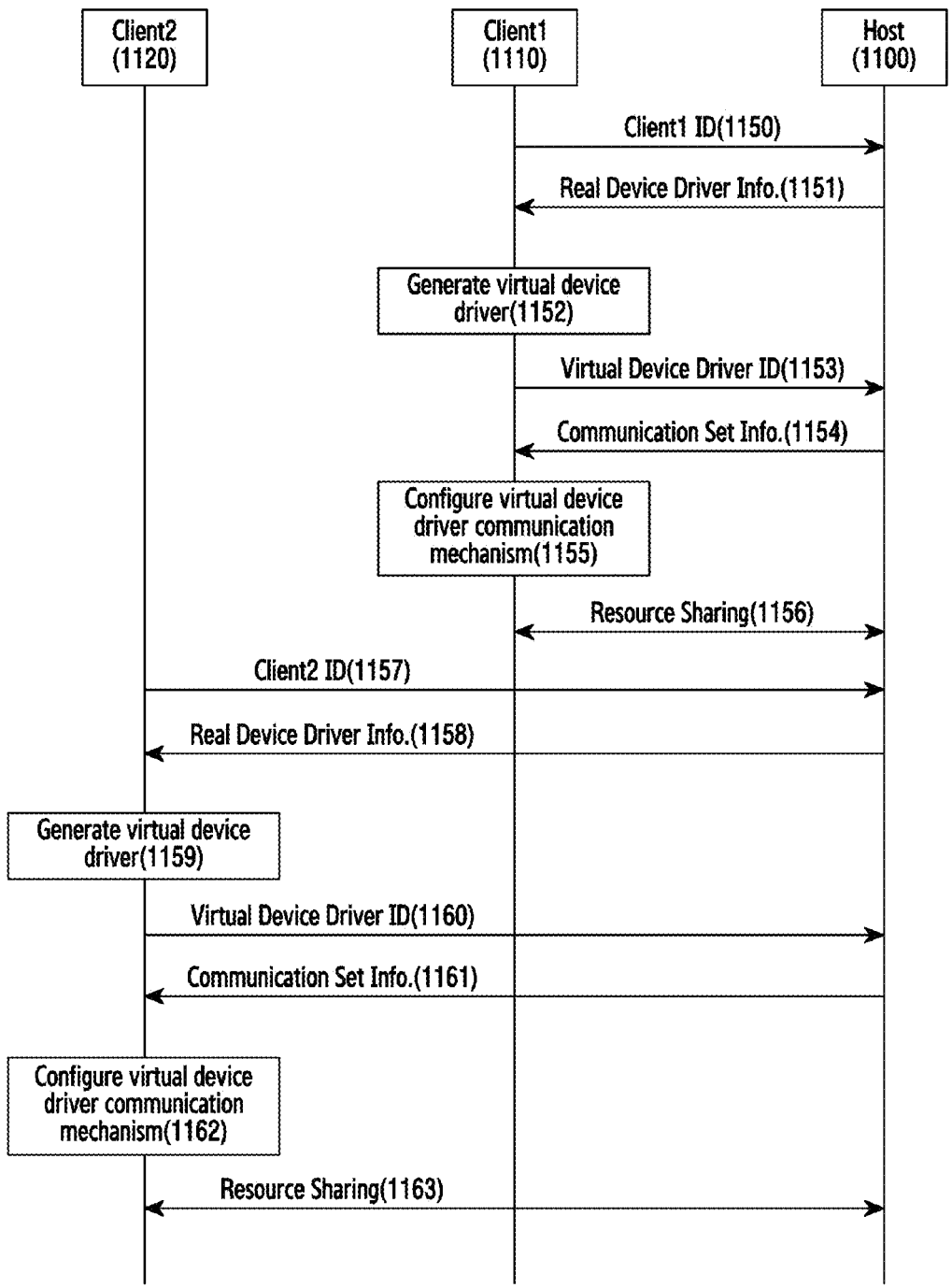
FIG. 11 is a flowchart illustrating an operation of directly sharing a resource of a host electronic device by a plurality of client electronic devices according to various embodiments of the present disclosure.

FIG. 11 is a flowchart illustrating an operation of directly sharing a resource of a host electronic device 1100 by a plurality of client electronic devices 1110 and 1120 according to various embodiments of the present disclosure.

For example, the first client electronic device 1110 and the second client electronic device 1120 may directly share the resource of the host electronic device 1100 through a network.

Referring to FIG. 11, in operation 1150, the first client electronic device 1110 may be subjected to a user authentication process with respect to the host electronic device 1100, and thereafter may transmit a client ID (e.g., a client1 ID) which is a unique identification assigned thereto to the host electronic device 1100. In operation 1151, the host electronic device 1100 may transmit real device driver information for resource sharing to the first client electronic device 1110.

In operation 1152, the first client electronic device 1110 may generate a virtual device driver based on the received real device driver information. In operation 1153, the first client electronic device 1110 may transmit a virtual device driver ID which is a unique identifier of the generated virtual device driver to the host electronic device 1100.

In operation 1154, the host electronic device 1100 may determine an optimal communication mechanism between the real device driver and the virtual device driver based on the virtual device driver ID. For example, by searching for the virtual device driver configuration information described above with reference to FIG. 5, communication set information such as a specific protocol type, sampling rate, frame rate, resolution, and the like associated with the virtual device driver ID may be transmitted to the first client electronic device 1110.

Herein, instead of the virtual device driver ID, an ID of an application which uses the virtual device driver may be transmitted to the host electronic device 1100. In this case, the host electronic device 1100 may search for the virtual device driver configuration information described above with reference to FIG. 6 and thus may transmit communication set information such as the specific protocol type, sampling rate, frame rate, resolution, and the like associated with the application ID to the first client electronic device 1110.

In operation 1155, the first client electronic device 1110 may configure a communication mechanism of the virtual device driver according to the communication set information. In operation 1156, the first client electronic device 1110 may perform data communication between the first client electronic device 1110 and the host electronic device 1100 and thus may effectively share a resource of the host electronic device 1100.

In operation 1157, the second client electronic device 1120 may be subjected to a user authentication process with respect to the host electronic device 1100, and thereafter may transmit a client ID (e.g., a client2 ID) which is a unique identification assigned thereto to the host electronic device 1100. In operation 1158, the host electronic device 1100 may transmit real device driver information for resource sharing to the second client electronic device 1120.

In operation 1159, the second client electronic device 1120 may generate a virtual device driver based on the received real device driver information. In operation 1160, the second client electronic device 1120 may transmit a virtual device driver ID which is a unique identifier of the generated virtual device driver to the host electronic device 1100.

In operation 1161, the host electronic device 1100 may determine an optimal communication mechanism between the real device driver and the virtual device driver based on the virtual device driver ID. For example, by searching for the virtual device driver configuration information described above with reference to FIG. 5, communication set information such as a specific protocol type, sampling rate, frame rate, resolution, and the like associated with the virtual device driver ID may be transmitted to the second client electronic device 1120.

Herein, instead of the virtual device driver ID, an ID of an application which uses the virtual device driver may be transmitted to the host electronic device 1100. In this case, the host electronic device 1100 may search for the virtual device driver configuration information described above with reference to FIG. 6 and thus may transmit communication set information such as the specific protocol type, sampling rate, frame rate, resolution, and the like associated with the application ID to the second client electronic device 1120.

In operation 1162, the second client electronic device 1120 may configure a communication mechanism of the virtual device driver according to the communication set information. In operation 1163, the second client electronic device 1120 may perform data communication between the second client electronic device 1120 and the host electronic device 1100 and thus may effectively share a resource of the host electronic device 1100.

That is, the first client electronic device 1110 and the second client electronic device 1120 may each directly share the resource of the host electronic device 1100 through the network.

Figure 12:
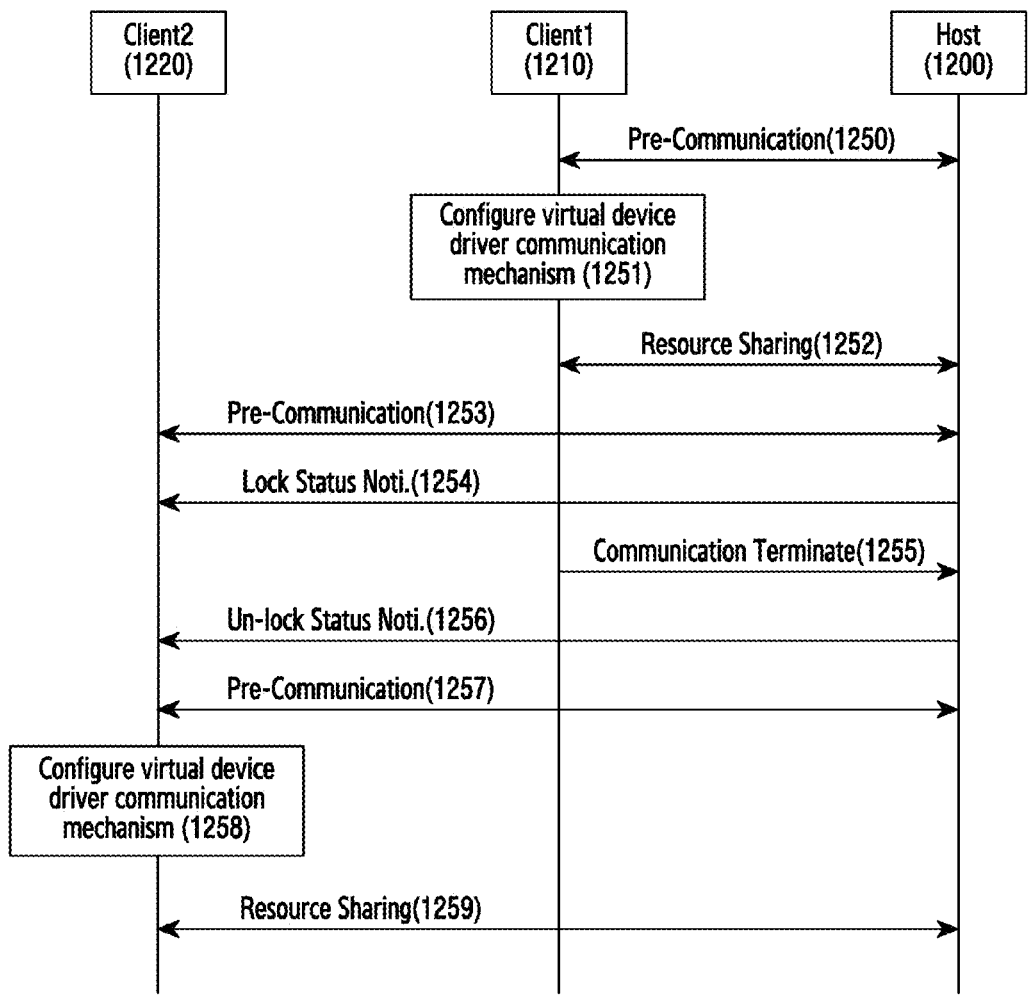
FIG. 12 is a flowchart illustrating an operation of assigning a priority for resource sharing of a host electronic device according to various embodiments of the present disclosure.

FIG. 12 is a flowchart illustrating an operation of assigning a priority for resource sharing of a host electronic device 1200 according to various embodiments of the present disclosure.

For example, a resource of the host electronic device 1200 may be shared by each of a first client electronic device 1210 and a second client electronic device 1220, and the host electronic device 1200 may assign a priority for the resource sharing to any client electronic device, and may restrict another remaining client electronic device to a lock state.

Referring to FIG. 12, in operation 1250, the first client electronic device 1210 may perform a user authentication process and a pre-communication operation with respect to the host electronic device 1200. In operation 1251, the first client electronic device 1210 may configure a communication mechanism of the virtual device driver according to a communication mechanism determined by the host electronic device 1200 through the pre-communication operation.

In operation 1252, the first client electronic device 1210 may directly share a resource of the host electronic device 1200 by performing data communication with the host electronic device 1200 by using the virtual device driver.

In operation 1253, the second client electronic device 1220 may perform a user authentication process and a pre-communication operation with respect to the host electronic device 1200. In operation 1254, the host electronic device 1200 may transmit a lock notification message indicating that resource sharing is impossible to the second client electronic device 1220 by considering that it is a priority resource sharing situation with respect to the first client electronic device 1201.

That is, the host electronic device 1200 may assign a priority for resource sharing to the first client electronic device 1210, and may restrict the second client electronic device 1220 to a lock state.

In operation 1255, if data communication with the first client electronic device 1210 is terminated, in operation 1256, the host electronic device 1200 may transmit a message for notifying a lock release to the second client electronic device 1220.

In operation 1257, if the lock release message is received, the second client electronic device 1220 may re-perform the user authentication and pre-communication operation with respect to the host electronic device 1200. In operation 1258, the second client electronic device 1220 may configure a communication mechanism of the virtual device driver according to the communication mechanism determined by the host electronic device 1200 through the pre-communication operation.

In operation 1259, the second client electronic device 1220 may directly share a resource of the host electronic device 1200 by performing data communication with the host electronic device 1200 by the use of the virtual device driver.

Figure 13:
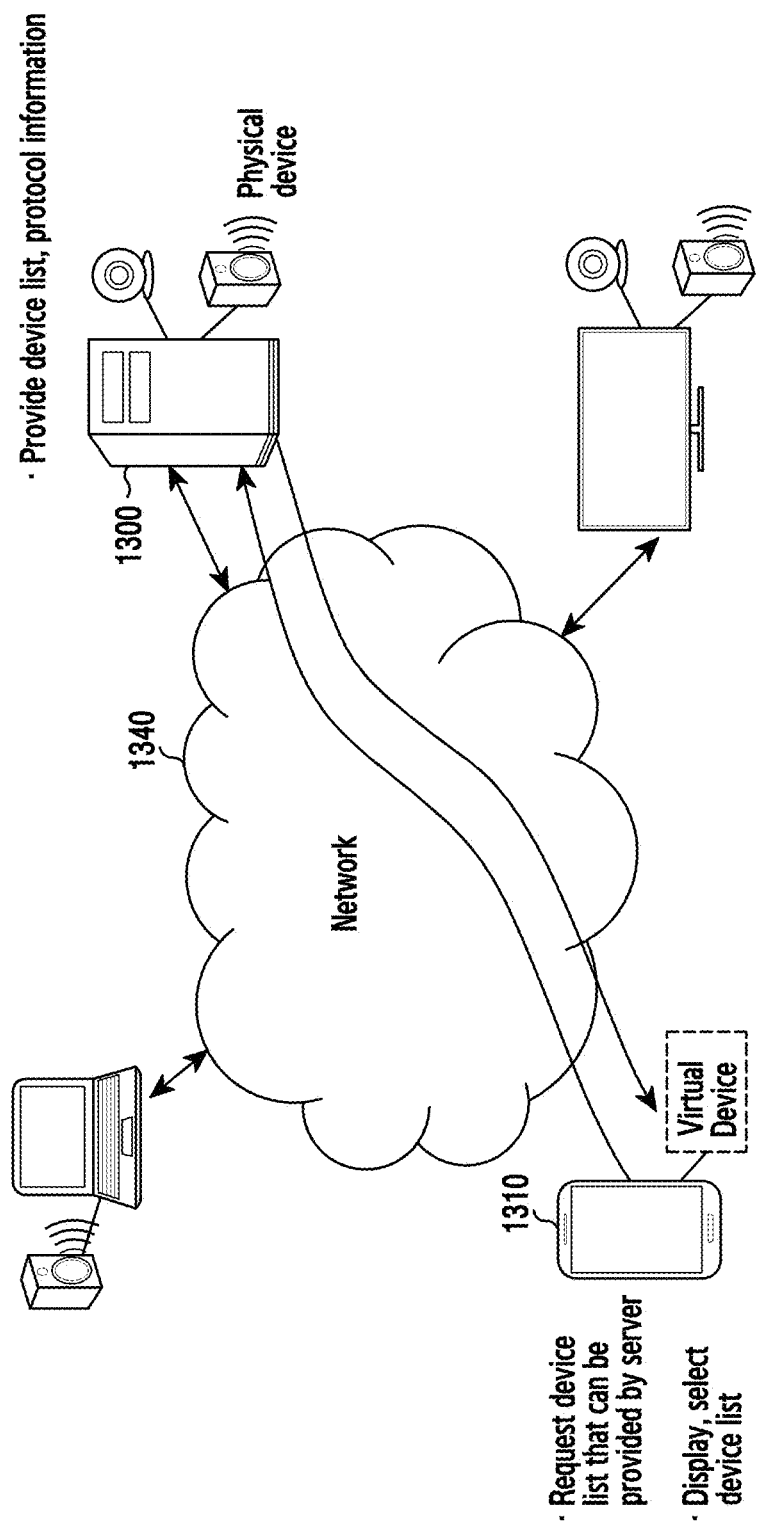
FIG. 13 illustrates an example in which a first client electronic device uses a real device driver of a host electronic device according to various embodiments of the present disclosure.
Figure 14:
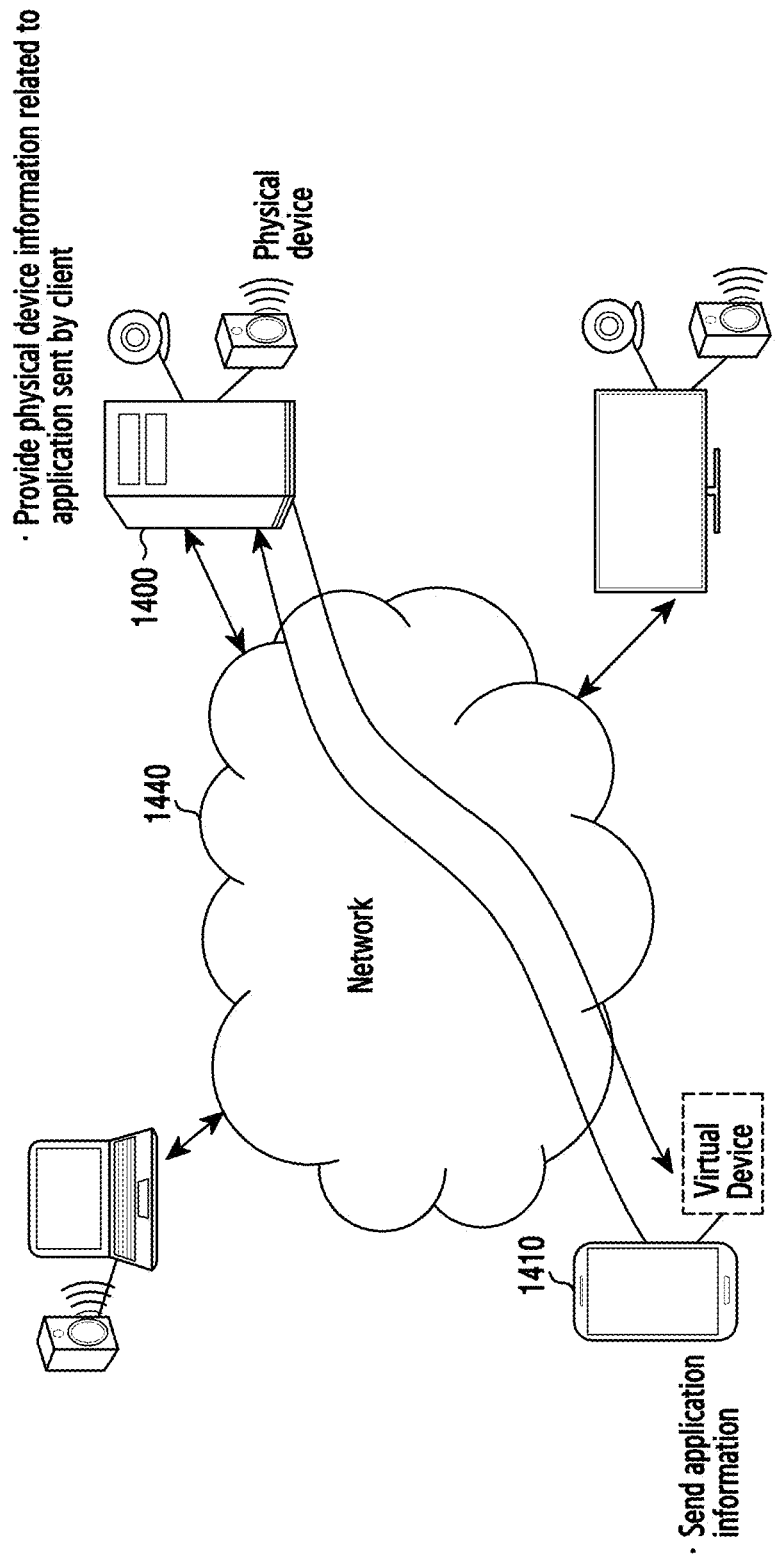
FIG. 14 illustrates another example in which a first client electronic device uses a real driver deriver of a host electronic device according to various embodiments of the present disclosure.

FIG. 13 illustrates an example in which a first client electronic device 1310 uses a real device driver of a host electronic device 1300 according to various embodiments of the present disclosure. FIG. 14 illustrates another example in which a first client electronic device 1410 uses a real driver deriver of a host electronic device 1400 according to various embodiments of the present disclosure.

Referring to FIG. 13, the host electronic device 1300 may provide through a network 1340 a list of currently available real device drivers to the first client electronic device 1310, and the first client electronic device 1310 may receive the list and display the list to a user interface (UI) screen.

The first client electronic device 1310 may receive a user selection via the UI screen and request the host electronic device 1300 to provide a real device driver corresponding thereto. Thereafter, the first client electronic device 1310 may download the real device driver and install it to the first client electronic device 1310.

Referring to FIG. 14, the first client electronic device 1410 may transmit identification information for an application currently being executed, e.g., an application ID and the like, through a network 1440 to the host electronic device 1400.

The host electronic device 1400 may automatically provide a real device driver information associated with the application or may provide it to the first client electronic device 1410 based on an application ID and the like received from the first client electronic device 1410.

Figure 15:
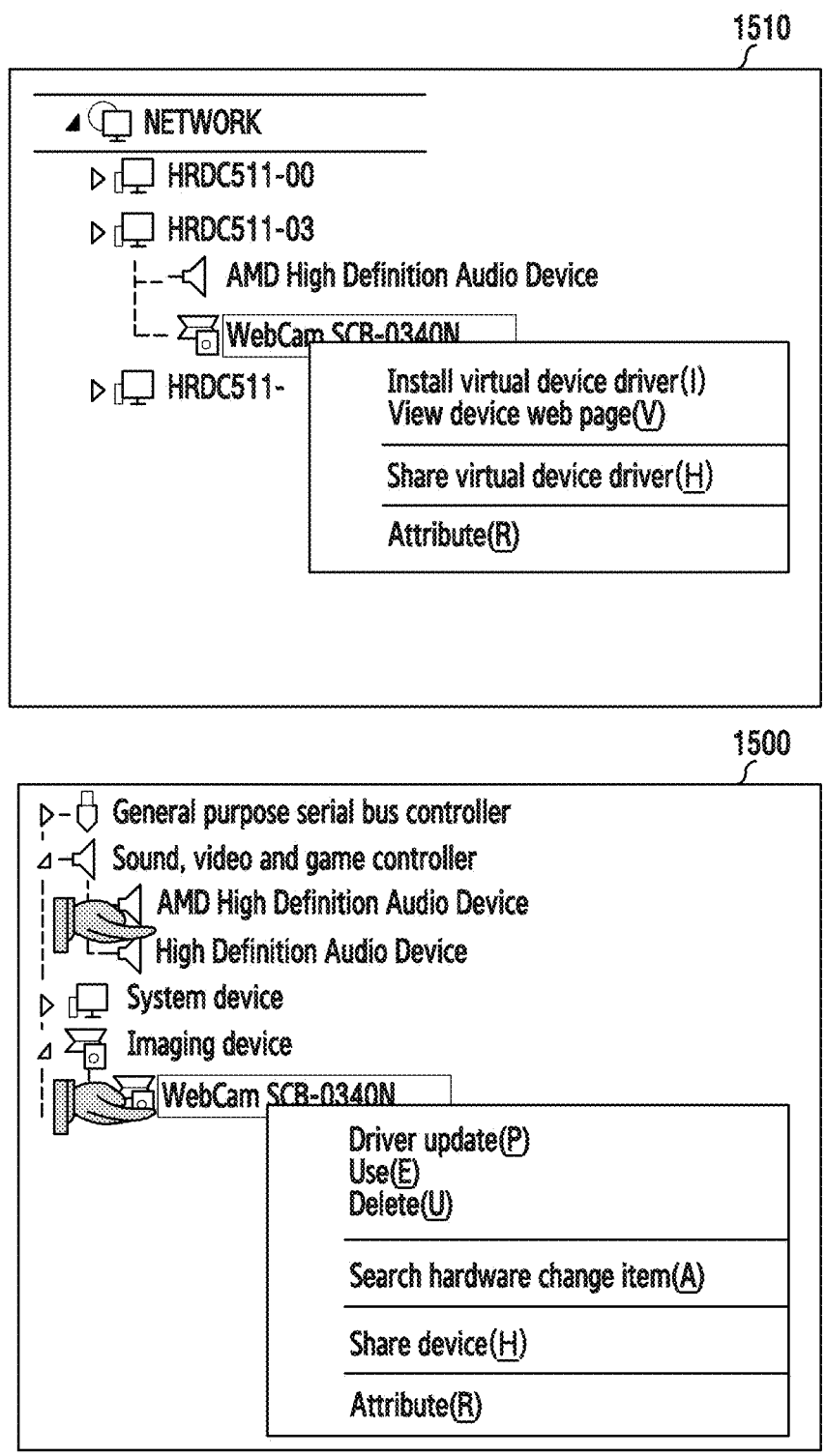
FIG. 15 illustrates an example of a display screen of the client electronic device and the host electronic device according to various embodiments of the present disclosure.

FIG. 15 illustrates an example of a display screen 1500 of the host electronic device 1400 and a display screen 1510 of the client electronic device 1410 according to various embodiments of the present disclosure. The client electronic device 1400 may display a variety of information and menu items associated with a real device driver provided by the host electronic device 1410.

Referring to FIG. 15, information and menu items associated with virtual device driver installing, virtual device driver sharing, and the like in a display screen 1510 of the client electronic device 1410, and information and menu items associated with driver updating, device sharing, and the like may be displayed in a display screen 1500 of the host electronic device 1400.

Figure 16:
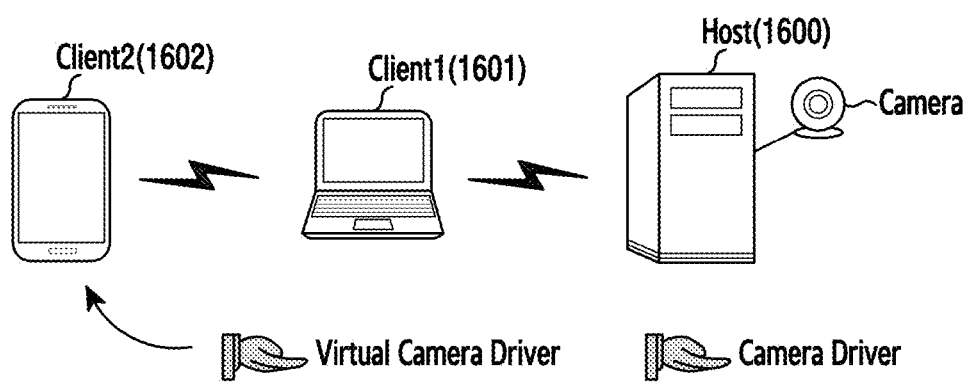
FIG. 16 illustrates an example in which a first client electronic device plays an intermediary role according to various embodiments of the present disclosure.

FIG. 16 illustrates an example in which a first client electronic device plays an intermediary role according to various embodiments of the present disclosure.

Referring to FIG. 16, a first client electronic device 1601 may play an intermediary role for providing a second client electronic device 1602 with a variety of information provided from a host electronic device 1600.

In this case, the first client electronic device 1601 may acquire information regarding the second client electronic device 1602 to which the information provided from the host electronic device 1600 will be delivered, or may acquire information regarding a plurality of sharable different client electronic devices and display the information to a UI screen, and thereafter may select at least any one of the client electronic devices. For example, the first client electronic device 1601 may acquire information of a camera 1600a and a virtual camera driver from a host electronic device 1600 and share the information to the selected second client electronic device 1602.

Figure 17:
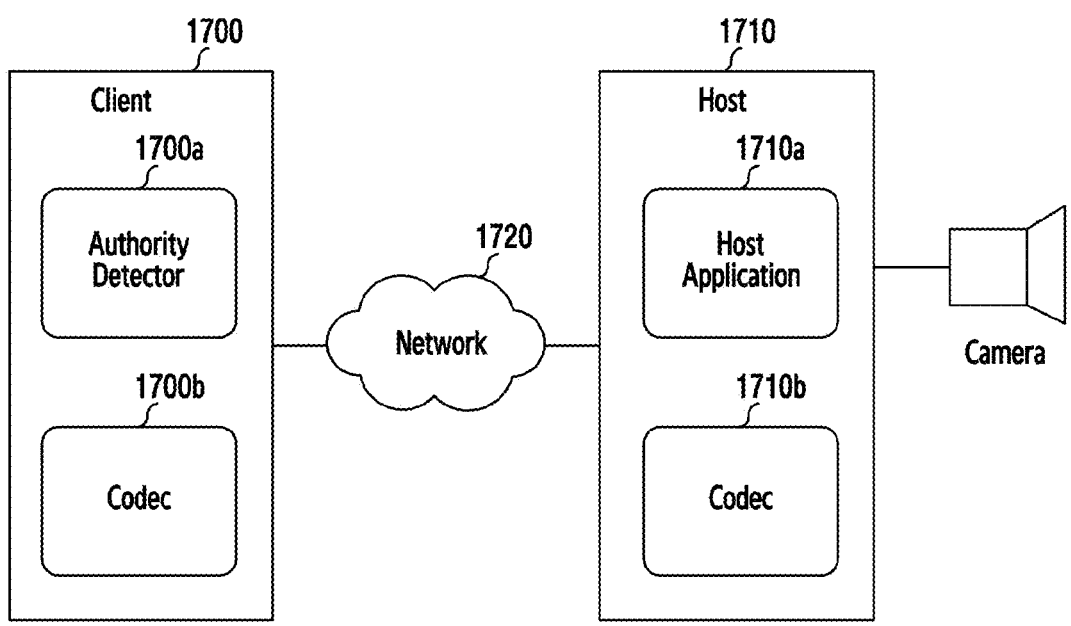
FIG. 17 illustrates an example for a security channel configuration and connection between a client electronic device and a host electronic device according to various embodiments of the present disclosure.

FIG. 17 illustrates an example for a security channel configuration and connection between a client electronic device 1700 and a host electronic device 1710 according to various embodiments of the present disclosure.

Referring to FIG. 17, the client electronic device 1700 may configure not only a communication mechanism of a virtual device driver but also a security channel with respect to the host electronic device 1710, through an interface operation with respect to the host electronic device 1710.

For example, authority detector 1700a and a corresponding host application 1710a for user authentication or device authentication may be added to the client electronic device 1700 and the host electronic device 1710, respectively.

The authority detector 1700a and host application 1710a may perform an authority detection function for detecting an authorized user or an authorized device before performing data communication between the client electronic device 1700 and the host electronic device 1710, and for this, may exchange a predetermined authentication key.

In addition, coder-decoders (CODECs) 1700b and 1710b for compressing and encrypting transmission/reception data may be added to the client electronic device 1700 and the host electronic device 1710. A connection between the client electronic device 1700 and the host electronic device 1710 may be established through a network 1720 based on a transmission control protocol (TCP) communication, whereas device data may be transmitted through an additional communication channel.

Figure 18:
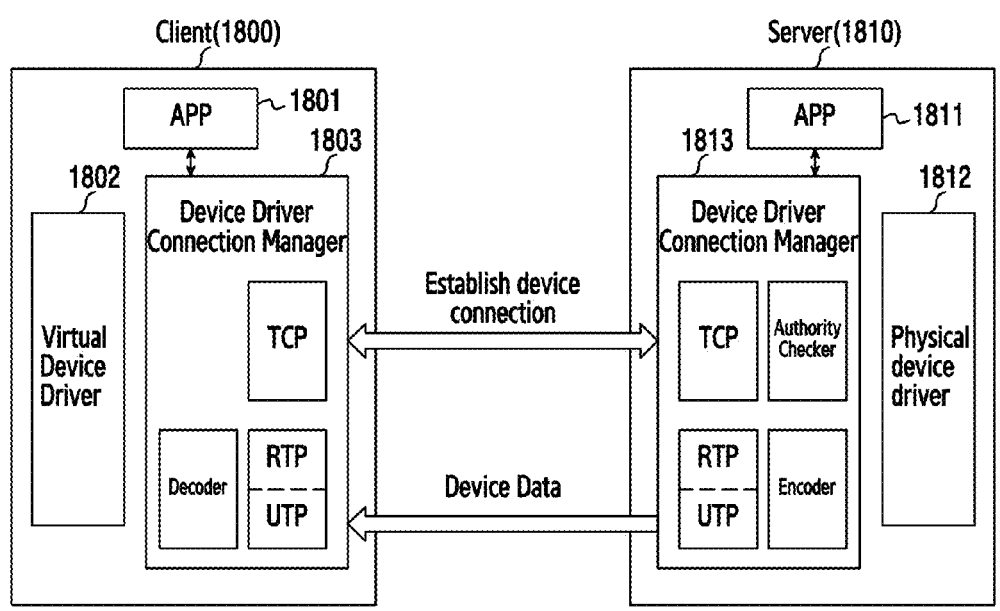
FIG. 18 illustrates an operation of establishing a security channel and a connection when a device driver connection is configured between a client electronic device and a host (or server) electronic device according to various embodiments of the present disclosure.

FIG. 18 illustrates an operation of establishing a security channel and a connection when a device driver connection is configured between a client electronic device 1800 and a host (or server) electronic device 1810 according to various embodiments of the present disclosure.

Not only a protocol between the client electronic device 1800 and the host electronic device 1810 but also a security channel between the client electronic device 1800 and the host electronic device 1810 may be configured.

An authority detector may be added for authentication between the client electronic device 1800 and the host electronic device 1810, and may perform a function of confirming whether data is transmitted from an authorized device or gateway before exchanging the data. In this case, an authentication key may be exchanged between the client electronic device 1800 and the host electronic device 1810.

When a connection is established between the client electronic device 1800 and the host electronic device 1810, an encoding unit may be added to encrypt device data or to reduce a data transmission amount. In doing so, security threat from unauthorized other devices can be reduced through traffic analysis or data interception.

When a connection is established between the client electronic device 1800 and the host electronic device 1810, the connection may be established between a client and a host based on a TCP communication, and device data may be delivered through an additional communication channel Applications 1801 and 1811, device driver connection managers 1803 and 1813, virtual device driver 1802, and physical device driver 1812 perform substantially similar functions as described above with regard to FIG. 2, and a description thereof will not be repeated.

Figure 19:
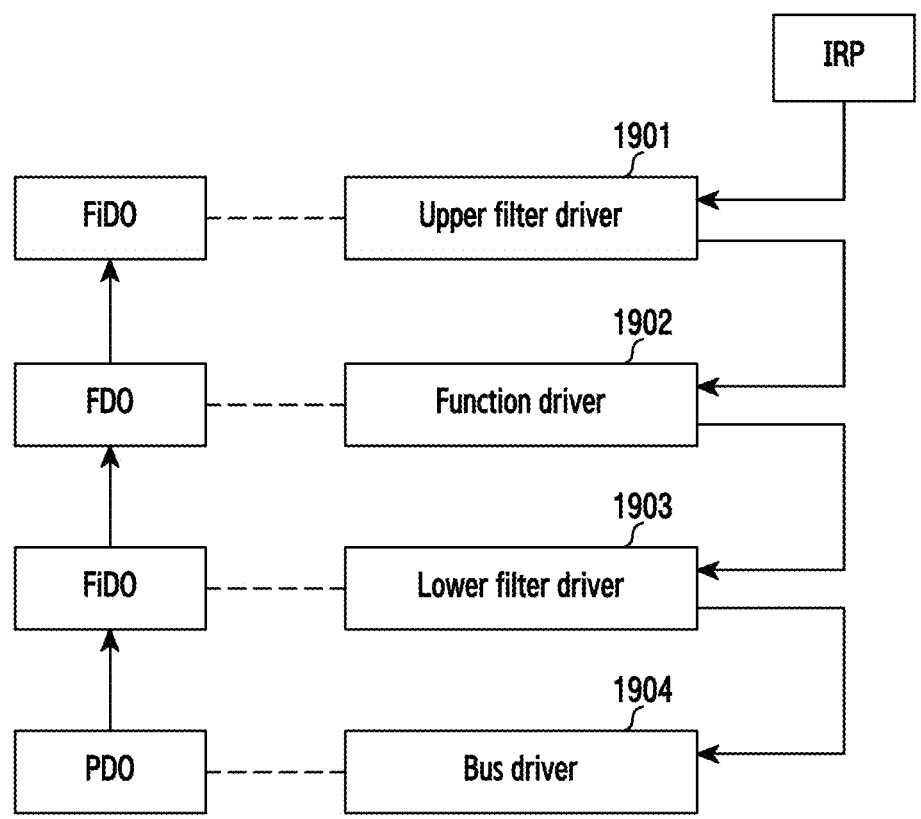
FIG. 19 illustrates a process of generating a virtual device driver on the basis of real device information according to various embodiments of the present disclosure.

FIG. 19 illustrates a process of generating a virtual device driver based on real device information according to various embodiments of the present disclosure.

Referring to FIG. 19, a windows driver model (WDM) presents, for example, a driver layer. In general, a stack of a device object may be presented as shown in FIG. 19.

For example, IPR stands for an I/O Request Packet, and almost every I/O has a data structure format called the IRP and indicates an operation to be performed by a driver. According to a device, the device stack may have layers more than or less than those illustrated in FIG. 19. The device object may be regarded as a data structure generated by a system so that hardware is managed by software.

One device object implies a logical, virtual, or physical device for processing an I/O request. Many device objects may exist for one physical device. A device object having a lowest level in a device stack is called a physical device object (PDO), and a device object existing in a middle layer level in the device stack is called a functional device object (FDO).

One or more filter device objects (FiDOs) may be located above and below the FDO. A filter device object located above the FDO may be called an upper filter driver 1901. A filter device object located between the FDO and the PDO is called a lower filter driver 1903. A function driver 1902 may be located between the upper filter driver 1901 and the lower filter driver 1903. A bus driver 1904 may be located below the lower filter 1903. A virtual device driver may be generated by emulating a physical device by the use of the filter driver.

According to various embodiments of the present disclosure, a client electronic device generates a virtual device driver corresponding to a real device driver of a host electronic device, and effectively shares a resource of the host electronic device by using the virtual device driver through a communication mechanism designated by the host electronic device in accordance with the virtual device driver. Therefore, a network traffic, a latency time, and the like generated by the resource sharing of the host electronic device can be effectively decreased.

According to various embodiments of the present disclosure, a client electronic device which shares a resource of a host electronic device can further extend a sharing area by delivering data of the resource to at least one different client electronic device. If the resource sharing with the host electronic device fails, a failure notification message is delivered to the at least one different client electronic device, thereby being able to avoid unnecessary network traffic generation and the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating a client electronic device, the method comprising:
   receiving, from a host electronic device, first information regarding a real device driver of the host electronic device based on a first protocol;
   generating, based on the first information, a virtual device driver corresponding to the real device driver of the host electronic device, the virtual device driver used for an application which is stored in the client electronic device;
   transmitting, to the host electronic device, second information regarding an identifier (ID) of the virtual device driver or an ID of the application, based on the first protocol;
   receiving, from the host electronic device, third information regarding a second protocol, based on the first protocol, wherein the second protocol is determined based on the ID of the virtual device driver or the ID of the application; and
   receiving, from the host electronic device, a resource through the virtual device driver, based on the second protocol.

2. The method of claim 1,
   wherein the receiving of the first information comprises:
      transmitting, to the host electronic device, information regarding an ID of the client electronic device based on the first protocol; and
      receiving the first information regarding the real device driver, based on the first protocol, and
   wherein the first information regarding the real device driver is determined based on the ID of the client electronic device.

3. The method of claim 2, wherein the second protocol is further determined based on the ID of the client electronic device.

4. The method of claim 1, wherein the ID of the virtual device driver is an ID of a virtual device driver being executed on an operating system (OS) of the client electronic device.

5. The method of claim 1, wherein, if the virtual device driver has not been stored in the client electronic device, the virtual device driver is generated by installing data which is downloaded from the host electronic device.

6. The method of claim 1, wherein the ID of the application is generated based on at least one of a name, a universally unique identifier (UUID), or a serial number of the application.

7. The method of claim 1, wherein, if the virtual device driver has been stored in the client electronic device, the virtual device driver is generated by activating the stored virtual device driver.

8. The method of claim 1, wherein the third information comprises at least one of protocol type information, sampling rate information, frame rate information, or resolution information configured in the host electronic device based on the ID of the virtual device driver or the ID of the application.

9. The method of claim 1, further comprising delivering the resource received from the host electronic device by the client electronic device to at least one other client electronic device.

10. The method of claim 9, further comprising:
    if the client electronic device fails to receive the resource from the host electronic device, generating a failure notification message; and
    sending the failure notification message to the at least one other client electronic device.

11. A client electronic device comprising:
    a communication module configured to communicate with a host electronic device; and
    a processor configured to control the communication module,
    wherein the processor is further configured to:
       control to receive, from a host electronic device, first information regarding a real device driver of the host electronic device based on a first protocol,
       generate, based on the first information, a virtual device driver corresponding to the real device driver of the host electronic device, the virtual device driver used for an application,
       control to transmit, to the host electronic device, second information regarding an identifier (ID) of the virtual device driver or an ID of the application based on the first protocol,
       control to receive, from the host electronic device, third information regarding a second protocol based on the first protocol, the second protocol determined based on the ID of the virtual device driver or the ID of the application, and
       control to receive, from the host electronic device, a resource via the virtual device driver based on the second protocol.

12. The client electronic device of claim 11,
    wherein the processor is further configured to:
       control to transmit, to the host electronic device, information regarding an ID of the client electronic device based on the first protocol, and
       control to receive, from the host electronic device, the first information regarding the real device driver based on the first protocol, and
    wherein the first information regarding the real device driver is determined based on the ID of the client electronic device.

13. The client electronic device of claim 12, wherein the second protocol is further determined based on the ID of the client electronic device.

14. The client electronic device of claim 11, wherein the ID of the virtual device driver is an ID of a virtual device driver being executed on an operating system (OS) of the client electronic device.

15. The client electronic device of claim 11, wherein if the virtual device driver has not been stored in the client electronic device, the virtual device driver is generated by installing data which is downloaded from the host electronic device.

16. The client electronic device of claim 11, wherein the ID of the application is generated based on at least one of a name, a universally unique identifier (UUID), or a serial number of the application.

17. The client electronic device of claim 11, wherein, if the virtual device driver has been stored in the client electronic device, the virtual device driver is generated by activating the stored virtual device driver.

18. The client electronic device of claim 17, wherein the third information comprises at least one of protocol type information, sampling rate information, frame rate information, or resolution information configured in the host electronic device based on the ID of the virtual device driver or the ID of the application.

19. The client electronic device of claim 11, wherein the processor is further configured to control to deliver the resource received from the host electronic device by the client electronic device to at least one different client electronic device.

20. A non-transitory computer-readable storage medium for storing one or more programs for executing an operation of:
    receiving, from a host electronic device, first information regarding a real device driver of the host electronic device based on a first protocol;
    generating, based on the first information, a virtual device driver corresponding to the real device driver of the host electronic device, the virtual device driver used for an application which is stored in the client electronic device;
    transmitting, to the host electronic device, second information regarding an identifier (ID) of the virtual device driver or an ID of the application, based on the first protocol;
    receiving, from the host electronic device, third information regarding a second protocol, based on the first protocol, wherein the second protocol is determined based on the ID of the virtual device driver or the ID of the application; and
    receiving, from the host electronic device, a resource through the virtual device driver, based on the second protocol.

\* \* \* \* \*